Oct. 3, 1961 W. D. ISBELL 3,002,705

TAPE REEL LOCK

Filed Dec. 16, 1957

INVENTOR.
Willard D. Isbell
BY
ATTORNEY.

United States Patent Office 3,002,705

Patented Oct. 3, 1961

3,002,705

TAPE REEL LOCK

Willard D. Isbell, Tulsa, Okla., assignor to Midwestern Instruments, Inc., Tulsa, Okla., a corporation of Delaware Filed Dec. 16, 1957, Ser. No. 703,163
7 Claims. (Cl. 242—68.2)

This invention relates to a novel expanding arbor especially adapted for permitting quick and easy mounting and removal of a revolvable device on a spindle, and has to do more particularly with tape recorded reels and associated spindles.

It is the most important object of the present invention to provide an arbor that is adapted to be mounted upon the spindle of a tape recorder and which is also adapted to be received by the tubular hub of the reel, there being included in the arbor itself quickly releasable means for clamping the arbor to the hub in any desired position of the reel with respect to the spindle.

Another important object of the present invention is to provide an arbor that is made in a manner to assure concentricity of the reel with respect to the spindle, notwithstanding any variations in the hub itself so far as true cylindrical configuration thereof is concerned.

Another important object of the instant invention is the provision of an arbor having expanding parts which, when placed in operation, force an extensible element into firm engagement with the hub of the reel throughout the entire internal circumference of the latter, thereby eliminating all movement laterally or otherwise, between the reel and the arbor.

Other objects include the provision of an expanding arbor especially adapted for the purposes above set forth that may be placed in use without need of tools; that is simple in design and, therefore, capable of mass production; that can be made of inexpensive materials; and which may be adapted for use in connection with virtually every type of tape recorder and reels therefor.

Other important objects will be made clear or become apparent as the following specification progresses, reference being had to the accompanying drawing wherein.

Figures 1, 2, 3, 4, 5:
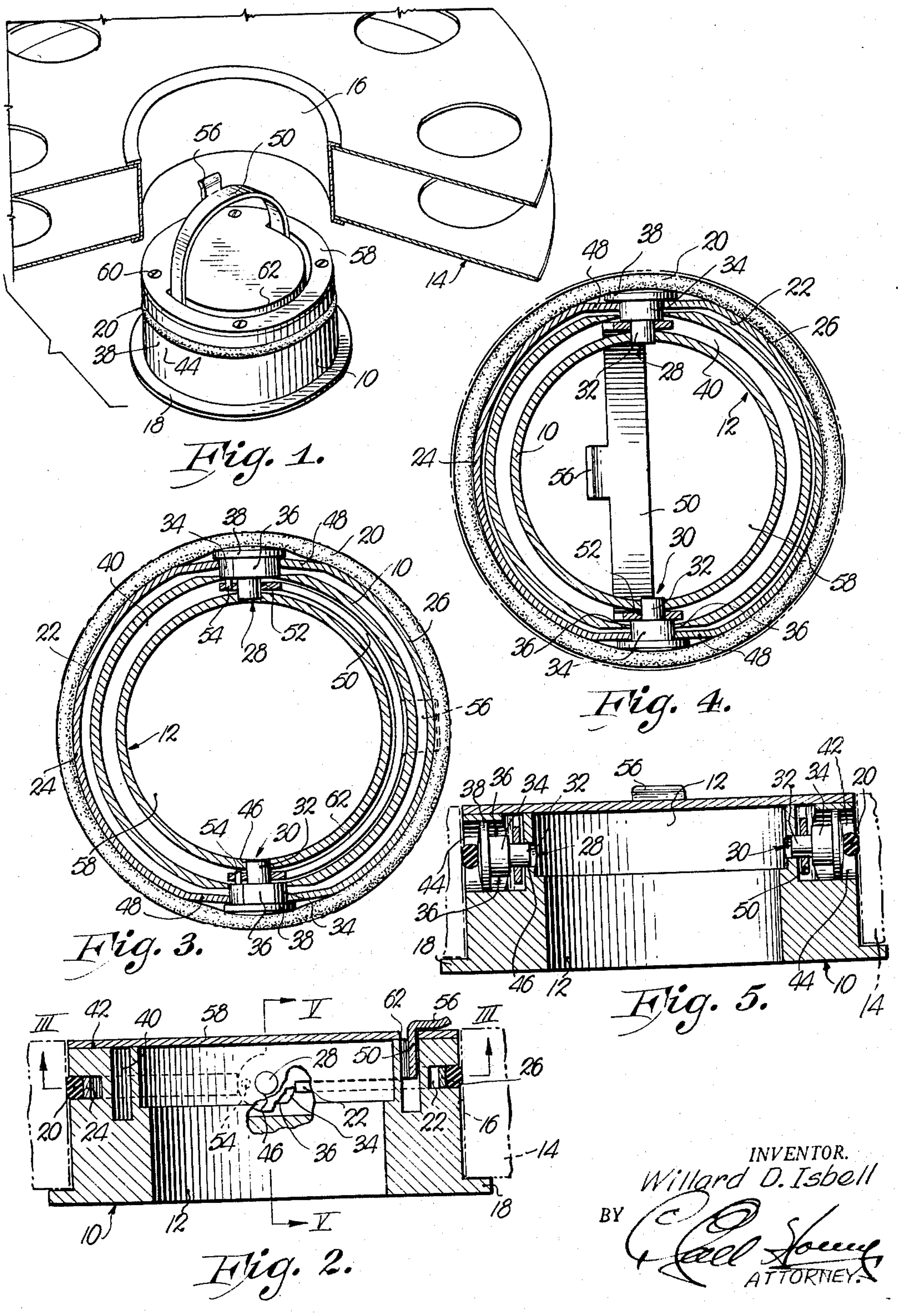
FIG. 1 is a perspective view of a tape reel lock made pursuant to the present invention illustrating the same in position to be received by a tape recorder reel, the latter of which is shown fragmentarily.
FIG. 2 is an enlarged, substantially central, cross-sectional view through the arbor shown in FIG. 1.
FIG. 3 is a cross-sectional view taken on line III—III of FIG. 2 looking in the direction of the arrows.
FIG. 4 is a view similar to FIG. 3 except only that the locking mechanism is released.
FIG. 5 is a cross-sectional view taken on line V—V of FIG. 2.

The expanding arbor illustrated in the drawing and forming the subject matter of the instant invention, includes as a part thereof a body broadly designated by the numeral 10 and provided with a cylindrical bore 12 adapted to receive the spindle of a tape recorder (not shown).

The means for mounting the body 10 on such spindle may constitute simply a relatively tight slip fit or other conventional mechanism not shown. In any event, when the body 10 is thus mounted on the spindle, it rotates therewith to in turn rotate a revolvable device such as a tape recorder reel 14 that is attached to the arbor as hereafter made clear. Reel 14 is provided with a cylindrical hub 16 which receives the body 10 and bears against outturned flange 18 on the latter as illustrated schematically in FIG. 2 of the drawing.

The tubular hub 16 of the revolvable device 14 surrounds an extensible element 20 forming a part of the expanding arbor, the element 20 preferably taking the form of an O-ring made from rubber or other resilient frictionable material. The continuous ring 20 fits within an annular groove 22 formed in the body 10 and is extended through operation of radially expansible structure which includes not only a pair of shoes 24 and 26, but oscillatory apparatus in the nature of a pair of diametrically opposed members 28 and 30.

Each member 28 and 30 is provided with a relatively short, circular pintle 32, cam means 34 that is circular except for a pair of diametrically opposed flats 36 and of greater diameter than that of the pintle 32, and a circular flange 38 of still greater diameter than that of the cam means 34.

The members 28 and 30 traverse the groove 22 and an annular cavity 40 within the body 10 between groove 22 and bore 12 and extending inwardly from one end 42 of the body 10. It is to be noted that body 10 is provided with opposed openings 44 that intersect groove 22 and are of sufficient diameter to receive the flange 38 and the cam means 34 of the members 28 and 30. Still further, body 10 is provided with openings 46 which journal the pintles 32 and permit radial movement of the members 28 and 30 toward and away from each other.

The shoes 24 and 26 are in the nature of substantially semi-circular, arcuate bands of resilient material and are disposed within the groove 22 for free radial movement, it being noted that the element 20 completely surrounds not only the shoes 24 and 26, but encompasses the elements 28 and 30. Each shoe 24 and 26 terminates in spaced fingers 48 that are preferably straight and flat and have the ends thereof bearing against corresponding cams 34. FIGS. 3 and 4 of the drawing clearly illustrates the disposition of the fingers 48 inwardly of the flanges 38, thereby placing the latter between the ring 20 and the fingers 48.

All of the mechanism for extending the element 20 is manually operable and to this end, there is provided manually movable means in the nature of a U-shaped bail or lever 50 for rotating the members 28 and 30 and thereby actuating shoes 24 and 26. The ends of the bail lever extend into the cavity 40 and are provided with openings 52 which receive the pintles 32. Relative rotation between the lever 50 and the elements 28 and 30 is prevented by the provision of a pin 54 eccentric to the pintle 32 on each member 28 and 30 respectively and extending through the lever 50 adjacent the opening 52 thereof. A finger tab 56 on the lever 50 intermediate the ends thereof facilitates swinging the latter from the position shown in FIG. 2 to the released and extended position shown by FIG. 1.

A cover 58 is releasably attached to the end 42 of body 10 through a plurality of fasteners 60 and has a semi-circular slot 62 therein registering with cavity 40 for clearing the lever 50 as is apparent in FIGS. 1 and 2.

In operation, the reel 14 is placed on the arbor when the radially expansible structure is released as shown in FIGS. 1 and 4. The tubular hub 16 of reel 14 readily slips into place over the arbor in surrounding relationship to the body 10 and the ring 20. When the hub 16 is moved firmly against the flange 18 of body 10, the operator need merely swing the lever 50 downwardly and inwardly from the position shown in FIG. 1 to a position within cavity 40 and slot 62 concentric with the axis of rotation of the arbor, as shown in FIGS. 2 and 3. It is to be noted that the inward movement of the lever 50 is limited by fingerpiece 56 coming to rest on the upper surface of cover plate 58.

Such inward swinging of the lever 50 imparts rotative movement to the oscillatory members 28 and 30 to expand the shoes 24 and 26 radially outwardly in opposite directions. It is to be noted, as shown in FIG. 4, that normally, when the structure is released and bail 50 is extended outwardly as shown in FIG. 1, the ends of the fingers 48 bear against the opposed flats 36 on the members 28 and 30. Thus, when lever 50 is swung inwardly the distance between the ends of the fingers 48 is increased by action of the cam means 34.

Manifestly, such forcing of the shoes 24 and 26 radially outwardly to extend the element 20 tightly against the inner face of hub 16 causes the two fingers 48 of each shoe 24 and 26 to spread apart. This spreading takes place forthwith upon the bights of shoes 24 and 26 expanding to a position pressing the ring 20 tightly against hub 16.

Consequently, by virtue of the fact that the diametrically opposed members 28 and 30 are also expandable away from each other, fingers 48, acting on flanges 38, cause the latter to move against the ring 20 in a radial direction and cooperate with the shoes 24 and 26 to provide a 360° extension of the ring 20 into engagement with the hub 16.

It is now apparent that imperfections in concentricity in hubs 16 are accommodated by the resilient nature of the ring 20 and the way in which the latter is held against the hub 16 throughout the annular length of the ring 20. When the arbor is mounted on the spindle and in position carrying the reel 14, the latter is automatically locked concentric to the arbor and, therefore, to the spindle. This, of course, is extremely important in tape recorder apparatus since it maintains constant tape speeds.

Furthermore, since the lever 50 is easily and quickly released, the expandable arbor above described provides for infinite indexing of reel position. It is even possible on slow speed equipment, to change the reels while the spindle and the arbor are in motion.

The construction is such as to permit manufacture within all space requirements notwithstanding the thickness of the reels, and it is seen that all parts are of captive design. The operating lever 50 serves as a visual indicator for locked or unlocked reels.

These and many other advantages emanate from an expanding arbor of the kind illustrated in the drawing and above described and, therefore, it is desired to be limited only by the spirit of the invention as defined by the scope of the appended claims.

Having thus described the invention what is claimed as new and desired to be secured by Letters Patent is:

1. For a revolvable device having a tubular hub, an expanding arbor for mounting said device on a spindle, said arbor comprising a body adapted to be received by said hub and having a bore adapted to fit onto said spindle; an extensible ring surrounding the body; radially expansible structure between the body and said ring for extending the latter against the hub, said structure comprising a pair of opposed resilient shoes, each partially surrounding the body and each having a pair of diametrically spaced ends; oscillatory apparatus for expanding the shoes and including a pair of diametrically opposed members rotatably carried by the body, each member having cam means engageable with said ends of the shoes therebetween; and a swingable lever coupled with said members for oscillating the same, said resilient shoes being spread apart by said cam means toward the hub to force said ring against the hub, said members being radially movable and each having a portion thereof disposed between the ring and the shoes whereby the members are moved outwardly against the ring as said ends of the shoes spread apart.

2. The invention as set forth in claim 1, wherein said body has a circumferential groove receiving the shoes.

3. The invention as set forth in claim 1, wherein said lever comprises a U-shaped bail and said body has a cavity receiving the bail when the latter is swung to a position expanding the shoes and the members.

4. The invention as set forth in claim 3, wherein said body has a circumferential groove receiving the shoes, said members traversing the cavity and the groove.

5. For a revolvable device having a tubular hub, an expanding arbor for mounting said device on a spindle, said arbor comprising a body adapted to be received by said hub and having a bore adapted to fit onto said spindle; an extensible element surrounding the body; radially expansible resilient structure between the body and said element for extending the latter against the hub; oscillatory apparatus carried by the body and provided with cam means engageable with said structure for expanding the latter; and manually movable means coupled with said apparatus for oscillating the latter, said apparatus comprising a pair of diametrically opposed members rotatably carried by the body between the latter and said element, said cam means being on each member respectively, said structure comprising a pair of opposed, substantially semicircular resilient shoes, each partially surrounding the body and each having a pair of diametrically spaced ends, said cam means engaging the ends of the shoes.

6. The invention as set forth in claim 5, wherein said resilient shoes are spread apart by said cam means toward the hub to force said element against the hub.

7. The invention as set forth in claim 5, wherein said members are radially moveable and each has a portion thereof disposed between the element and the shoes whereby the members are moved outwardly against the element as said ends of the shoes spread apart.

References Cited in the file of this patent

UNITED STATES PATENTS

| | | |
|---|---|---|
| 1,455,068 | Bjorkquist | May 15, 1923 |
| 2,696,950 | Ranger | Dec. 14, 1954 |

FOREIGN PATENTS

| | | |
|---|---|---|
| 11,179 | Great Britain | May 22, 1896 |